(12) United States Patent
Ruiz

(10) Patent No.: US 8,098,458 B2
(45) Date of Patent: Jan. 17, 2012

(54) SLIDER WITH SHALLOW STEP PADS AND REAR SIDE POCKETS

(75) Inventor: Oscar J. Ruiz, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1083 days.

(21) Appl. No.: 11/732,649

(22) Filed: Apr. 3, 2007

(65) Prior Publication Data

US 2008/0247089 A1   Oct. 9, 2008

(51) Int. Cl.
*G11B 21/21* (2006.01)
*G11B 5/60* (2006.01)

(52) U.S. Cl. .............. 360/235.8; 360/235.7; 360/236.1

(58) Field of Classification Search ............... 360/235.4, 360/235.5, 235.7, 235.8, 236.1, 236.3, 236.5, 360/236.6, 236.8, 237
See application file for complete search history.

(56) References Cited

U.S. PATENT DOCUMENTS

| | | | | |
|---|---|---|---|---|
| 6,021,020 A * | 2/2000 | Itoh et al. | | 360/236.1 |
| 6,344,949 B1 * | 2/2002 | Albrecht et al. | | 360/236.5 |
| 6,661,611 B1 * | 12/2003 | Sannino et al. | | 360/236.3 |
| 6,678,119 B1 * | 1/2004 | Pendray et al. | | 360/236.6 |
| 7,477,486 B1 * | 1/2009 | Sun et al. | | 360/236.3 |
| 2002/0060881 A1 * | 5/2002 | Chapin et al. | | 360/235.8 |
| 2002/0071216 A1 * | 6/2002 | Sannino et al. | | 360/236.1 |
| 2002/0075599 A1 * | 6/2002 | Rao et al. | | 360/235.7 |
| 2002/0089790 A1 * | 7/2002 | Stoebe et al. | | 360/236.3 |
| 2002/0109941 A1 * | 8/2002 | Chapin et al. | | 360/235.7 |
| 2002/0135941 A1 * | 9/2002 | Kohira et al. | | 360/235.5 |
| 2003/0039073 A1 * | 2/2003 | Rao | | 360/235.8 |
| 2003/0231429 A1 * | 12/2003 | Boutaghou et al. | | 360/235.8 |
| 2004/0012887 A1 * | 1/2004 | Rajakumar et al. | | 360/236.2 |
| 2004/0156143 A1 * | 8/2004 | Kang | | 360/235.8 |
| 2005/0213253 A1 * | 9/2005 | Takahashi et al. | | 360/236.3 |
| 2005/0280943 A1 * | 12/2005 | Inoue et al. | | 360/236.2 |
| 2006/0238922 A1 * | 10/2006 | Hanyu | | 360/235.8 |
| 2007/0121251 A1 * | 5/2007 | Yoshida | | 360/236.3 |
| 2008/0117549 A1 * | 5/2008 | Huang et al. | | 360/234.3 |
| 2010/0309586 A1 * | 12/2010 | Ruiz | | 360/235.4 |

* cited by examiner

*Primary Examiner* — Craig A. Renner

(57) ABSTRACT

Embodiments of the present invention pertain to a slider designed to reduce fly height sigma. According to one embodiment, a slider includes an air bearing surface, a front shallow step pad, a rear shallow step pad, and rear side pockets. The front shallow step pad and the rear shallow step pad are at a first level deeper than the air bearing surface. The rear side pockets are at a second level deeper than the air bearing surface. The rear side pockets are in close proximity to rear corners of the slider.

2 Claims, 10 Drawing Sheets

SLIDER WITH SHALLOW STEP PADS AND REAR SIDE POCKETS

TECHNICAL FIELD

Embodiments of the present invention relate to sliders for disk drives. More specifically, embodiments of the present invention relate to designing a slider to reduce fly height sigma.

BACKGROUND

Typically a disk drive is used to store data. The disk drive can be, among other things, a direct access storage device (DASD) or a hard disk drive (HDD) and can include one or more disks and a disk controller to manage operations on the disks. The disks can be stacked vertically on a spindle by placing the spindle in the center of the disks. The spindle can be turned by a motor at velocities ranging from three to fifteen thousand revolutions per minute. The part of the disk that is nearest the spindle is commonly referred to as the inner diameter (ID) and the part of the disk that is furthest from the spindle is commonly referred to as the outer diameter (OD).

A read write head can be used to write data to and read data from a disk. The read write head is associated with a slider. The slider provides mechanical support for the read write head and electrical connections between the head and the drive. The slider can be attached to a suspension to form a head gimbal assembly (HGA). The HGA can be attached to an actuator arm, which is a part of an actuator assembly, to move and support the HGA. Further the slider includes a pattern of shaped pads on the air bearing surface (ABS) of the slider, which enables the slider to "fly" on an air cushion at a desired height above a disk.

The fly heights of a population of sliders can be plotted as depicted in FIG. 1. The vertical axis represents the frequency and the horizontal one the fly height. The standard deviation σ (also known as "fly height sigma") of the population can be used to measure the fly height spread of a group of parts sharing the same air bearing design. For example, σ1 indicates that the fly heights of this population are more spread apart than another population with σ2.

Manufacturers attempt as much as possible to create sliders that have approximately the same fly heights. The more similar the fly heights for a population of sliders are, the easier it is to manufacture disk drives that operate in a predictable manner and the fewer sliders that the manufacturer will have to dispose of. Therefore, manufacturers of sliders are constantly looking for ways to design sliders that provide as small of a fly height sigma as possible since this will enable them to manufacture disk drives more quickly, that are of superior quality and at a reduced cost.

SUMMARY OF THE INVENTION

Embodiments of the present invention pertain to a slider designed to reduce fly height sigma. According to one embodiment, a slider includes an air bearing surface, a front shallow step pad, a rear shallow step pad, and rear side pockets. The front shallow step pad and the rear shallow step pad are at a first level deeper than the air bearing surface. The rear side pockets are at a second level deeper than the air bearing surface. The rear side pockets are in close proximity to rear corners of the slider.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 2:
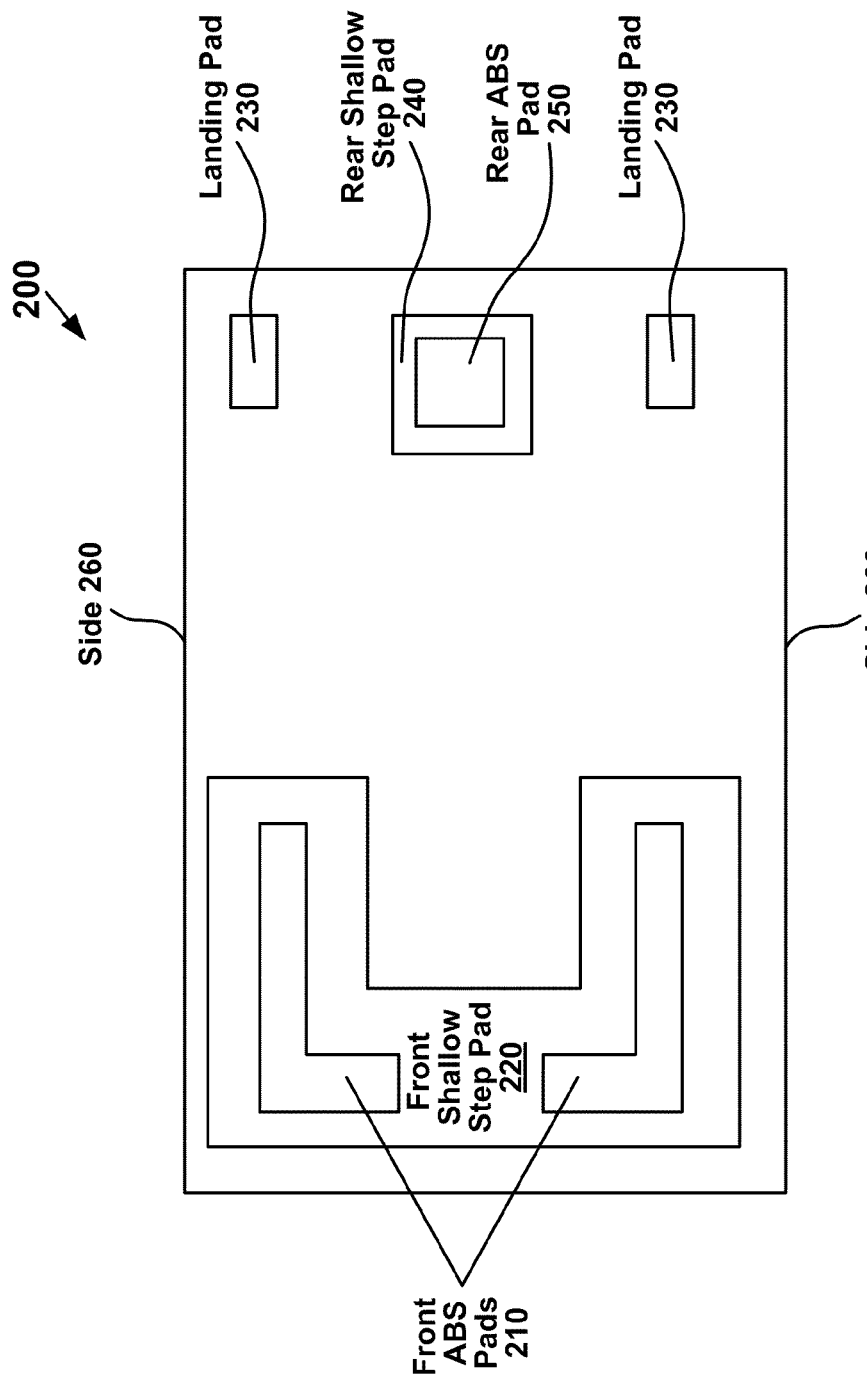
FIG. 2 depicts a conventional slider.

FIG. 2 depicts a conventional slider 200. The conventional slider 200 includes various structures such as front ABS pads 210, a front shallow step pad 220, a rear shallow step pad 240, a rear ABS pad 250, and landing pads 230 located near the rear corners of the slider 200. The structures 210-250 have shapes that are variations of rectangular polygons in nature since the structure 210-250's shapes are based on straight lines and do not include curved profiles. Streamlined structures that adapt to the natural air flow contours can help improve the performance of the air bearing. The geometric nature of the structures 210-250, among other things, associated with conventional sliders 200 limits how streamlined the slider 200's design can be.

Figure 3:
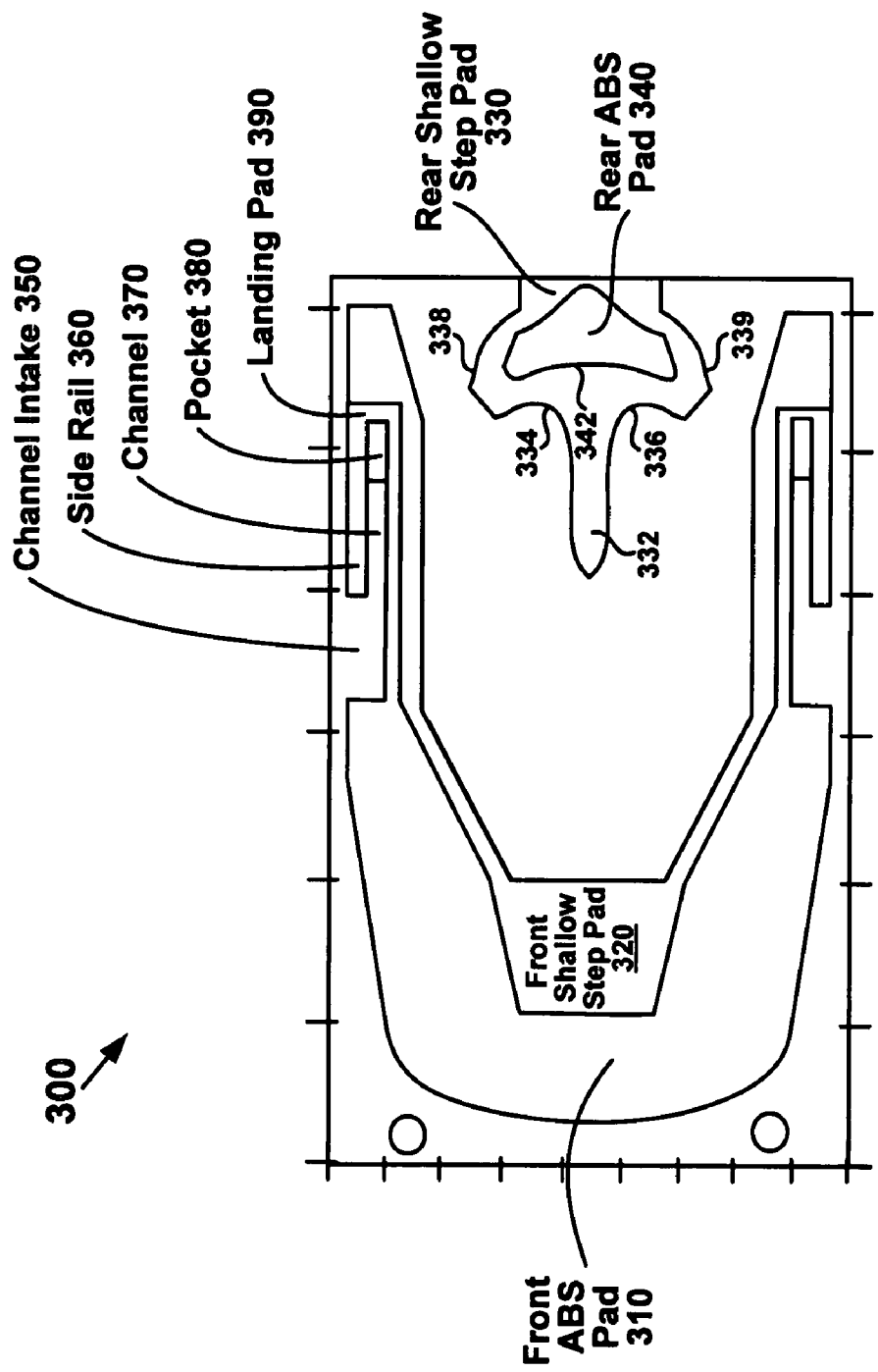
FIG. 3 depicts a slider designed to reduce fly height sigma, according to one embodiment.

In contrast, FIG. 3 depicts a slider 300, according to one embodiment, designed to reduce fly height sigma and improve other performance parameters. The slider 300 includes a front ABS pad 310, a front shallow step pad 320, a rear shallow step pad 330, a rear ABS pad 340, side rails 360, channels 370, channel intakes 350, rear side pockets 380, and landing pads 390. The slider 300 has channel intakes 350, side rails 360, channels 370, pockets 380, and side ABS pads 390 on both sides.

The rear shallow step pad 330 has several curves associated with it (330) that provide for smooth air flow properties that are not provided by conventional slider designs. The pockets 380 that are located on the sides and toward the rear of the slider 300 are at a second level deeper than the ABS. Among other things, the pockets 380 increase the roll stiffness of the slider 300. The front ABS pad 310 is shaped to increase the slider pitch stiffness. The rear ABS pad 340 is shaped to reduce the fly height loss effects of reduced ambient air pressure.

Factors that Affect Fly Height Sigma

Fly height variations occur due to inevitable variations in the manufacturing parameters. These variations produce unwanted forces that affect the fly height, the pitch and the roll of the slider, thus spreading of the fly height (increasing the fly height sigma) of the sliders. A good way of reducing such fly height spread is by increasing the stiffness of the air bearing or by reducing the sensitivity of the fly height with respect to the manufacturing parameters, so that the fly height deviations from the target value are minimized.

Figure 4:
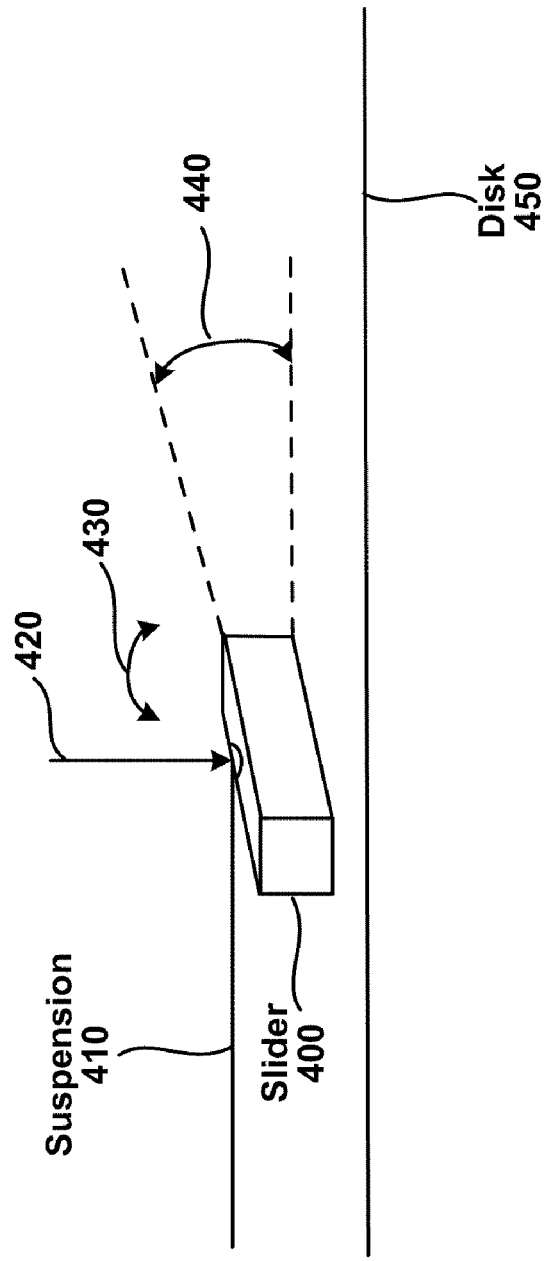
FIG. 4 depicts a slider gliding over the surface of a disk's surface, according to one embodiment

FIG. 4 depicts a slider 400 as it (400) glides over the surface of a disk 450, according to one embodiment. As the slider 400 glides over the disk 450's surface, air moves between the slider 400 and the disk 450's surface. This air causes the slider 400 to lift upwards. To counter the upward lifting, the suspension 410 applies a force 420 downwards on the slider 400 called preload. It also applies an upwards pitch moment 440 and a small or zero roll moment 430. Variations in either the preload or pitch or roll moments will affect the fly height attitude. A higher preload force will cause the slider to fly lower. A higher pitch moment will increase the slider pitch and reduce the fly height. A roll moment variation can cause either a fly height gain or loss.

The dimensions of the air bearing pads are also subject to manufacturing tolerances and also affect the slider fly height. For example, variations known as mask misalignment can alter the location of the air bearing pads with respect to the slider body. Variations in the curvature of the air bearing surface, such as longitudinal curvature or crown, and transversal curvature or camber, can deviate the curvature of the slider from its target value. Any of these variations increases or decreases the fly height of the sliders.

Environmental Factors that Affect Fly Height Sigma

People want to be able to use disk drives in different places on the earth. For example, they may want to use their computer at sea level and they may want to later use the same computer when in the mountains. Air pressure is higher at sea level than at higher altitudes. Air pressure affects how high a slider will fly. A common ambient air pressure effect is that, the lower the air pressure, the lower the slider will fly.

Figure 5:
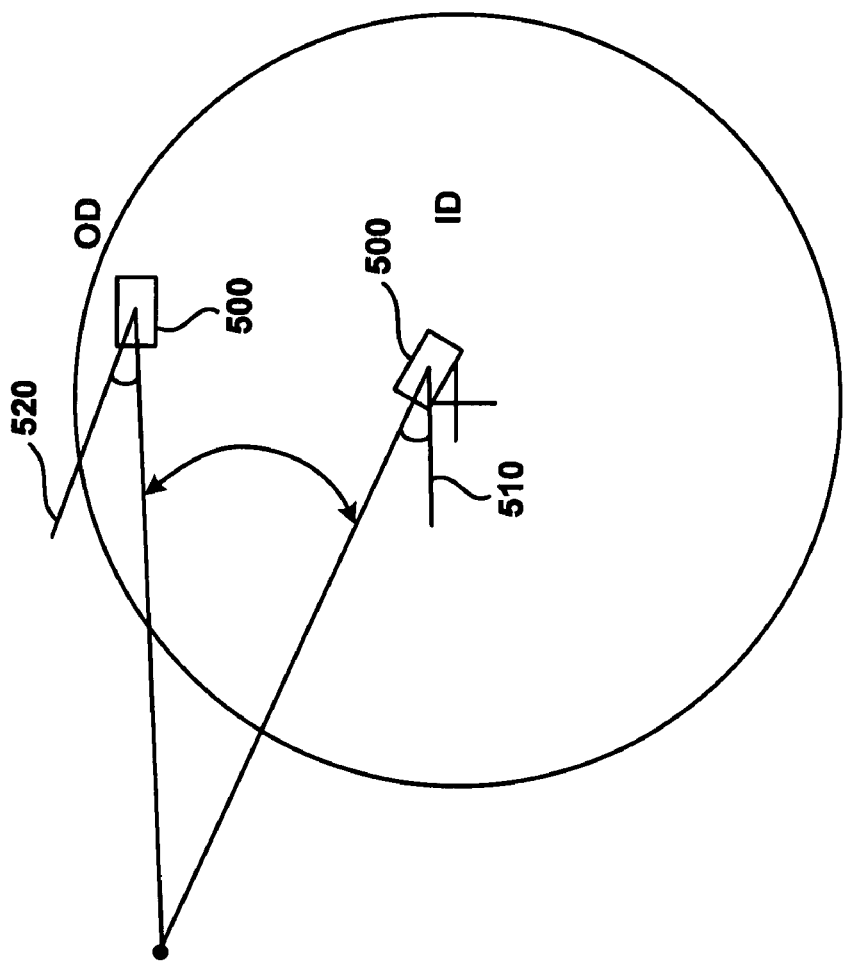
FIG. 5 depicts a slider positioned at the ID and at the OD, according to one embodiment

The magnitude of the velocity of the disk under the slider affects the slider flying attitude. FIG. 5 depicts a slider 500 positioned at the ID and at the OD, according to one embodiment. The velocity of the slider 500 is least at the ID because the radius of the disk is smallest at the ID. The velocity of the slider 500 continually increases as the slider 500 moves toward the OD since the disk's radius increases. Also, a disk drive will operate at higher speeds when performing at product speed (e.g., approximately 15,000 revolutions per minute) than at servo write speed (e.g., approximately 4,000 to 8,000 revolutions per minute).

The direction and the strength that air 510, 520 flows toward the slider 500 (also known as "skew") is another factor that affects fly height sigma. Referring to FIG. 5, line 510 represents the direction that air flows toward the slider 500 when it (500) is near the ID and line 520 represents the direction that air flows toward the slider 500 when it (500) is near the OD. Further, since the slider 500 travels at higher velocities when located near the OD, the strength of the air flow will increase as the slider 500 moves closer to the OD. For example, the strength of the air flow at 520 is stronger than the strength of the air flow at 510. The changes in the direction and the strength that the air flows toward a slider 500 can increase the probability that the slider 500 will roll, among other things.

Damping of the Air Bearing

As a component operates, there is a tendency for it to vibrate. Dampening is the ability of the component to counteract this tendency to vibrate. A component has dynamic stability if it has sufficient damping to contain the amplification when operating at its resonance. Various embodiments also provide for dynamic stability which can also result in reduced fly height sigma.

According to one embodiment, the slider 300 has a rectangular shape. For example, the slider 300 may be of the femto-L type, where the length is approximately 1.25 millimeters and the width is approximately 0.7 millimeters. Rectangular shaped sliders are more prone to rolling than square sliders. However, various embodiments of the present invention can be used to reduce the probability of a rectangular shaped slider, such as a Femto-L, from rolling and therefore reduce fly height sigma.

Front Abs Pad

Figure 6:
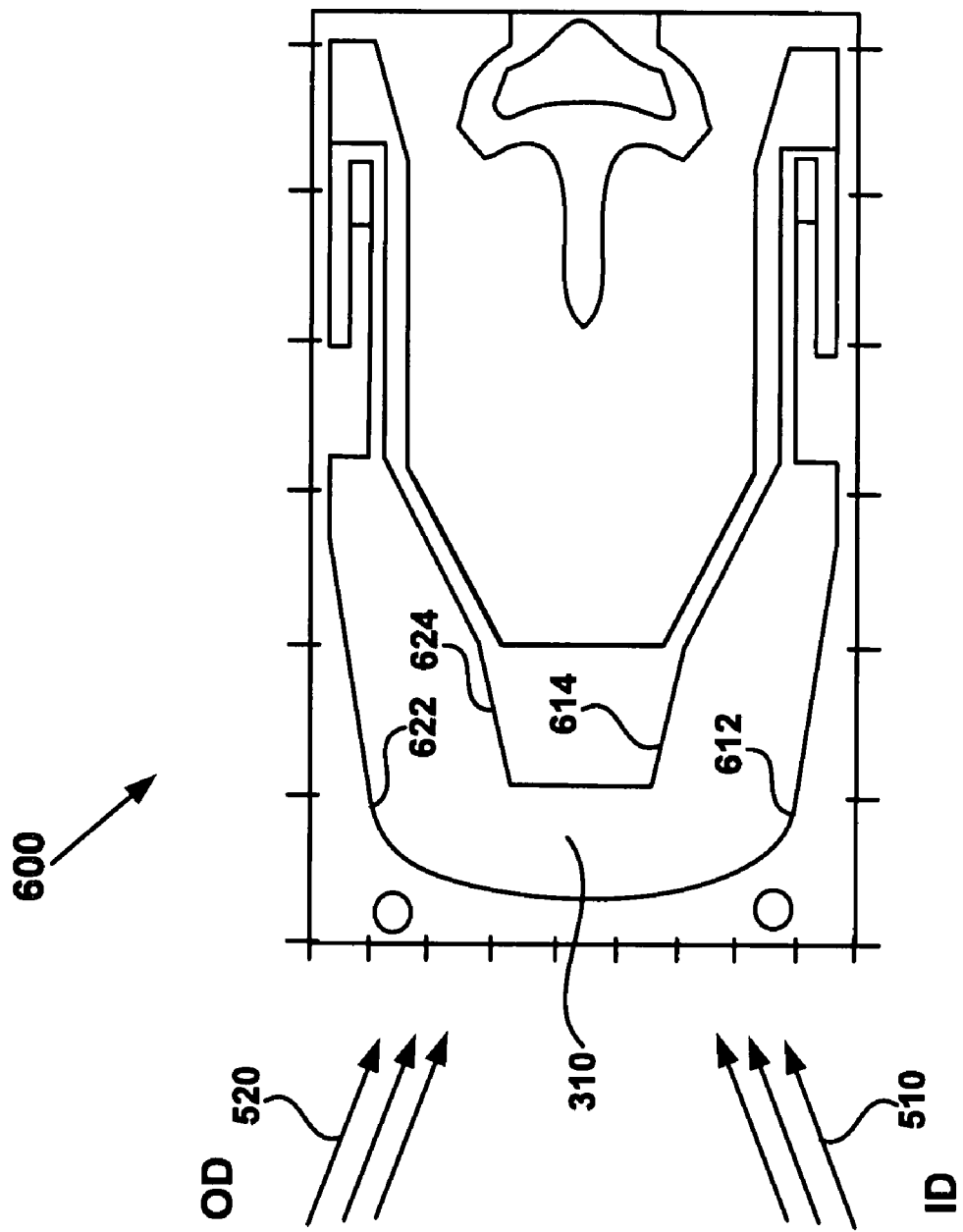
FIG. 6 depicts a slider with respect to air flowing towards the slider approximately from the ID and the OD, according to one embodiment.

FIG. 6 depicts a slider 600, according to one embodiment, with respect to air flowing 510, 520 towards the slider 600 approximately from the ID and the OD. Referring to FIGS. 3 and 6, as will become more evident, the front ABS pad 310 has a shape that reduces, among other things, the effects of skew 510, 520. The front abs pad 310 is shaped so that various edges 612, 614, 622, and 624 of it (310) are aligned with the direction 510, 520 air flows toward the slider 600. For example, as depicted in FIG. 6 the inside edge 614 and the outside edge 612 that are toward the slider 600's ID side are aligned approximately with the direction 520 that air flows toward the slider 600's OD side. The inside edge 624 on the slider 600's OD side is aligned approximately with the direction 510 that air flows toward the slider 600's ID side.

According to one embodiment, the outside edge 622 at the OD side is not aligned with the direction 510 that air flows toward the slider 600's ID side, for example, due to results from simulations of sliders. The simulation results indicated that edge 622 does not need to be aligned with the direction 510 of the air flow from the ID side, according to one embodiment. One possible reason for this is that the air flow from direction 520 tends to be stronger than the air flowing from direction 510.

Rear Shallow Step Pad

Referring to FIG. 3, the rear shallow step pad 330 includes a protrusion 332 (also referred to herein as a "rear shallow step pad protrusion") that is positioned approximately in the center of the front of the rear shallow step pad 330. The rear shallow step pad 330 also includes concavities 334, 336 (also referred to herein as "rear shallow step pad concavities") to each side of the protrusion 332.

The rear shallow step pad 330 has a non-geometric shape, according to one embodiment. For example, the rear shallow step pad 330 can have several curves associated with it (330). The protrusion 332 is curved, the concavities 334, 336 are curved, and the sides 338, 339 of the rear shallow step pad 330 are curved. The protrusion 332 reduces the probability of the slider 300 rolling since, for example, the protrusion 332 can redirect the flow of air. The protrusion 332 contributes to compensating for changes in air pressure and contributes to dynamic stability. The curve of the protrusion 332 toward the slider 300's OD side helps to compensate for the increased strength of air that flows from the OD side. The concavities 334, 336 reduce the effects of air pressure changes on fly height, according to one embodiment. The shape of the rear shallow step pad 330, which includes the protrusion 332, provide for lower sensitivity to changes in air pressure, provide for better dynamic stability through increased damping, and also provide for increased air bearing stiffness and reduced fly height sigma.

Figure 7:
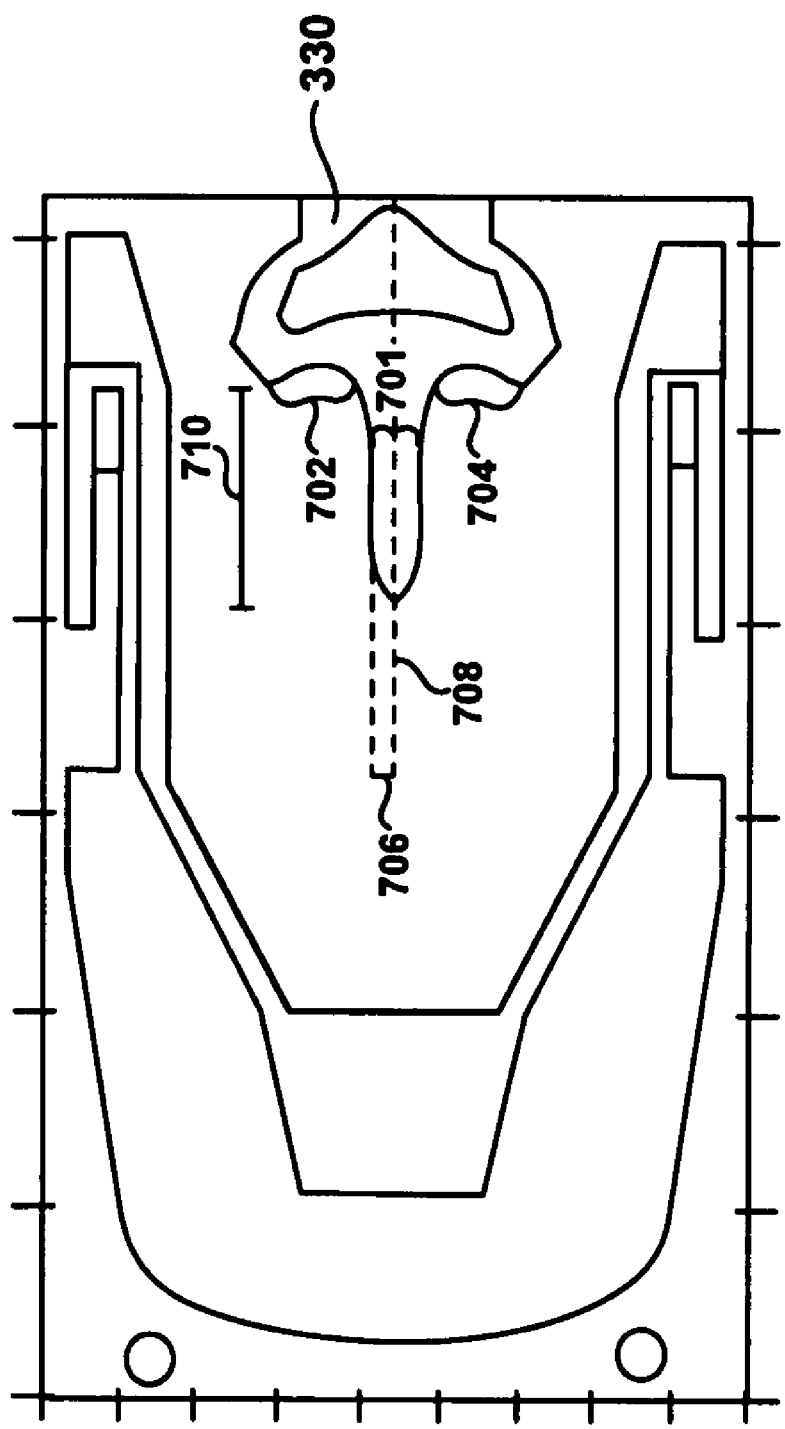
FIG. 7 depicts various dimensions associated with the rear shallow step pad, according to one embodiment.

FIG. 7 depicts various dimensions associated with the rear shallow step pad 330, according to one embodiment. Referring to FIGS. 3 and 7, the length 710 of the protrusion 332 can range from approximately 150-500 microns. According to one embodiment, the protrusion 332's length 710 is approximately 300 microns. The protrusion 332's width 701 can be approximately 100 microns or less. According to one embodiment, the protrusion 332's width 701 is approximately 30 microns. According to one embodiment, the protrusion 332's width 701 is as narrow as the manufacturing process is capable of making it (701).

The rear shallow step pad concavities 334, 336 are approximately 5-30 microns wide 702, 704. According to one embodiment, the rear shallow step pad concavities 334, 336 are approximately 15 microns wide 702, 704. According to one embodiment, the concavity 336 on the ID side is a little deeper than the concavity 334 on the OD side. For example, concavity 336 may be a few microns deeper than concavity 334.

According to one embodiment, the protrusion 332 is curved slightly toward the OD side. For example, the protrusion 332 may be curved 706 approximately 40 microns with respect to an axis 708 along the center of the protrusion 332.

Rear Abs Pad

The front of the rear abs pad is concave, according to one embodiment. The shape of the rear ABS pad helps increase the stiffness of the air bearing, increase damping and reduce the altitude sensitivity.

Figure 8:
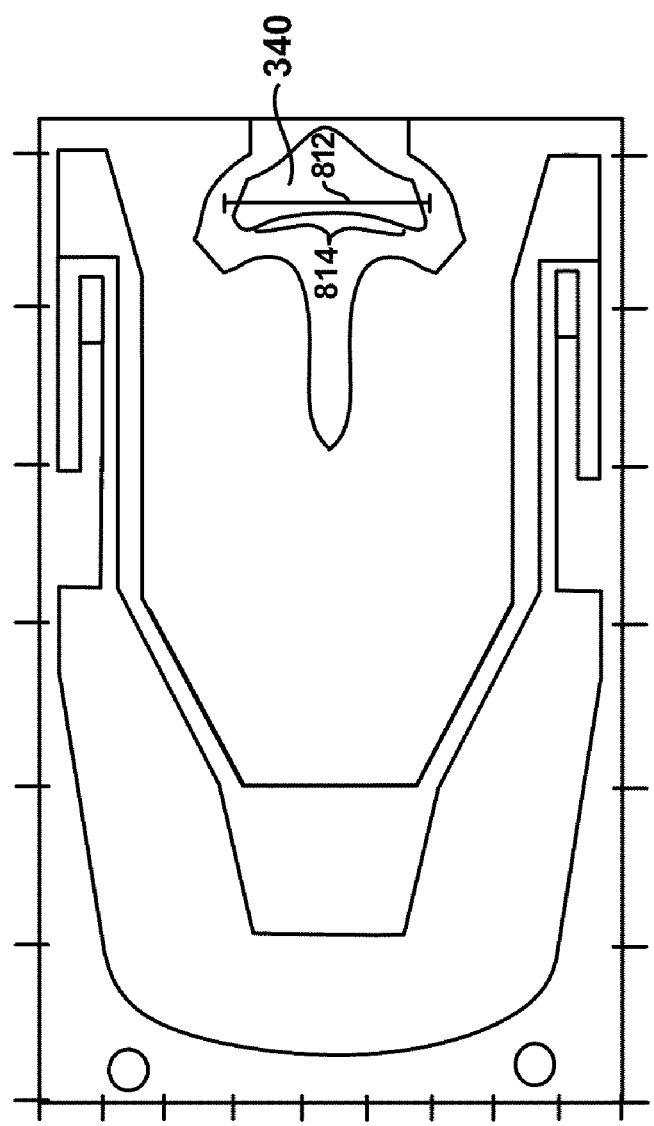
FIG. 8 depicts various dimensions associated with the rear ABS pad, according to one embodiment.

FIG. 8 depicts various dimensions associated with the rear ABS pad 340, according to one embodiment. The length 812 of the rear ABS pad 340 can range from approximately 150-300 microns. According to one embodiment, the length 812 of the rear ABS pad 340 is approximately 250 microns. The length 814 of the concavity 342 in the front of the rear ABS pad 340 ranges from approximately 10-60 microns. According to one embodiment, the length 814 of the concavity 342 is approximately 25 microns.

Rear Side Pockets

Figure 9:
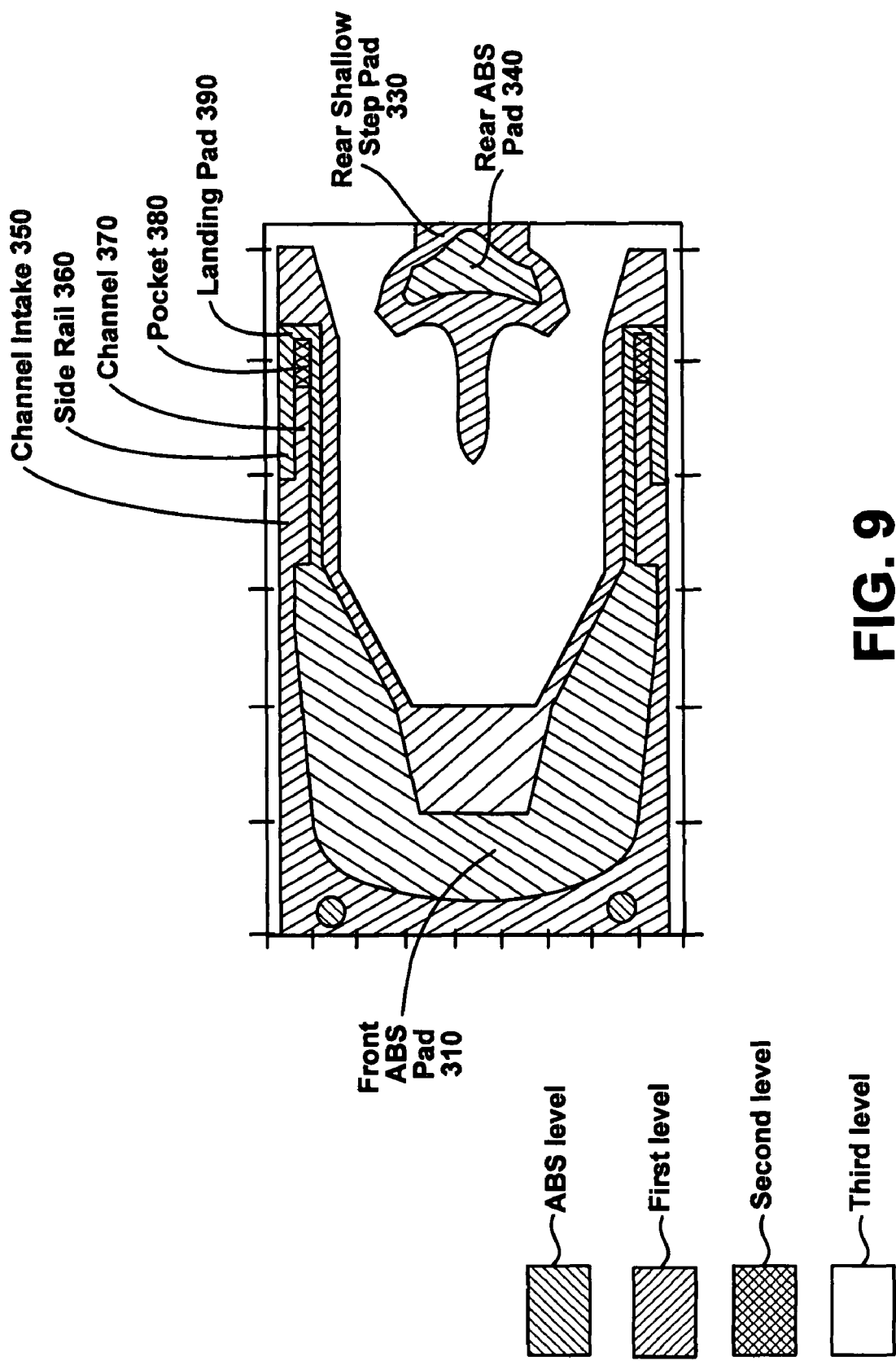
FIG. 9 depicts various etch levels of a slider, according to one embodiment.

According to one embodiment, the side pockets toward the rear of the slider increase the roll stiffness of the air bearing and reduce the probability of the slider rolling, among other things. According to one embodiment, the pockets are in close proximity to landing pads. As depicted in FIGS. 3 and 9, the side pads 390 are positioned behind the pockets 380. The pockets 380 are at a second level deeper than the air bearing surface.

FIG. 9 depicts various etch levels of a slider, according to one embodiment. For example, the shallow step pads 320, 330, and the channels 370 are at a first level deeper than the air bearing surface. The pockets 380 are another level deeper than the front shallow step pad 320, the rear shallow step pad 330, and the channels 370. As air encounters the front of the slider, the pressure of the air increases. The purposes of this illustration, the air pressure at this point shall be referred to as air pressure level A. The air pressure decreases as the air flows into the channel intakes 350 and down the channels 370. The air pressure increases to a level that is higher than air pressure level A when the air encounters the pockets 380. The build up in the air pressure on both sides of the slider reduces the probability that the slider will roll. Therefore, according to one embodiment, the channels or the pockets, or a combination thereof, help to reduce the probability of the slider rolling.

The sections Front ABS Pad, Rear Shallow Step Pad, Rear ABS Pad, and Pockets discussed various rational for the design of these structures. The discussion of the rational of the slider's design provides a few of the reasons that the design provides reduced fly height sigma. The discussion is not intended to provide all of the reasons for why the design provides for reduced fly height sigma.

Etch Levels of the Slider

Referring to FIG. 9, the first level is approximately 0.05 to 0.40 microns deeper than the ABS, the second level is approximately 1 to 4 microns deeper than the ABS, and the third level is approximately 1.05 to 4.4 microns, the sum of the first two levels, deeper than the ABS. According to one embodiment, the first level is approximately 0.18 microns deeper than the ABS and the second level is approximately 2.0 microns deeper than the ABS. The front ABS pad 310, the rear ABS pad 340, the side rails 360, and the side pads 390 are at ABS level and therefore are nearest to the disk. The front shallow step pad 320, the rear shallow step pad 330, the channel intakes 350, and the channels 370 are one level deeper (the first level) than the ABS level. The pockets 380 are two levels deeper (the second level) than the ABS. The area depicted with dots is three levels deeper (the third level) than the ABS.

Particles

Referring to FIG. 2, there is an opening between the front ABS pads 210 of the conventional slider 200. Further, the sides 260 of the conventional slider 200 are open. Particles can enter through the openings. Particles can accumulate in front of the landing pads 230 of the conventional slider 200. Typically sliders fly at approximately 6 to 15 nanometers above a disk. Therefore, the particles that come between the slider and the disk can damage the disk's surface. In contrast, referring to FIG. 3 according to one embodiment, the front ABS pad 310 is closed and the slider 300 has side rails 360 thus reducing the probability that particles will come between the slider 300 and the disk's surface.

Although the side rails 360 reduce the probability of particles coming between the slider 300 and the disk's surface, side rails 360 increase the probability of the slider 300 rolling.

For this reason, conventional sliders 200 do not have continuous side rails on both sides extending all the way to the slider end. At most, a conventional slider may have short side rails ending before the slider end on a long side rail or only one side. However, various embodiments of the present invention reduce the probability of a slider 300 rolling and therefore, a slider 300 according to one embodiment can provide side rails 360 on both sides of the slider 300.

Exemplary Disk Drive

Figure 10:
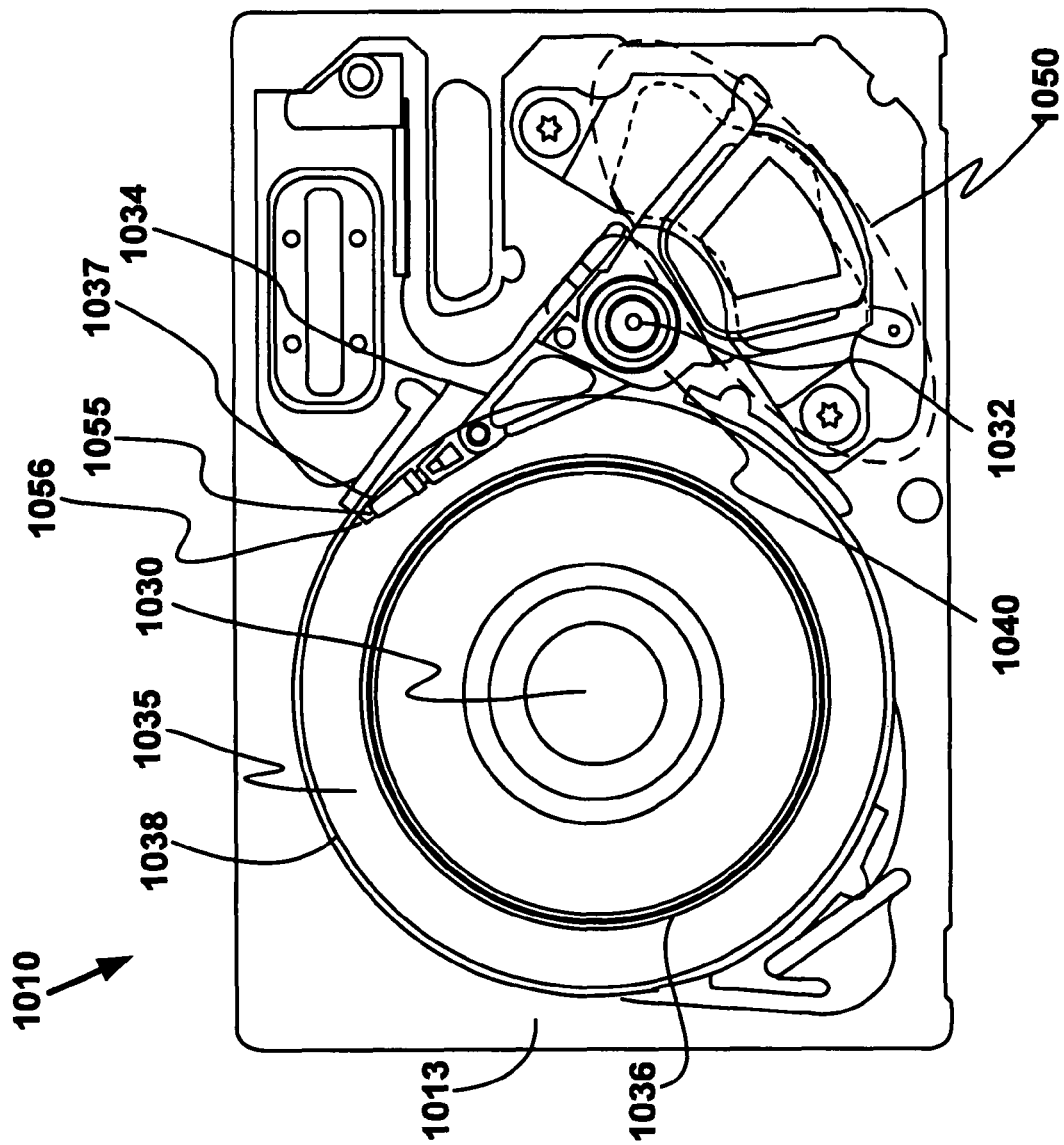
FIG. 10 depicts a plan view of a disk drive for facilitating the discussion of various embodiments of the present invention.

FIG. 10 depicts a plan view of a disk drive for facilitating the discussion of various embodiments of the present invention. The disk drive 1010 includes a base casting 1013, a motor hub assembly 1030, a disk 1038, actuator shaft 1032, actuator arm 1034, suspension assembly 1037, a hub 1040, voice coil motor 1050, a magnetic head 1056, and a slider 1055.

The components are assembled into a base casting 1013, which provides attachment and registration points for components and sub assemblies. A plurality of suspension assemblies 1037 (one shown) can be attached to the actuator arms 1034 (one shown) in the form of a comb. A plurality of transducer heads or sliders 1055 (one shown) can be attached respectively to the suspension assemblies 1037. Sliders 1055 are located proximate to the disk 1038's surface 1035 for reading and writing data with magnetic heads 1056 (one shown). The rotary voice coil motor 1050 rotates actuator arms 1034 about the actuator shaft 1032 in order to move the suspension assemblies 1037 to the desired radial position on a disk 1038. The actuator shaft 1032, hub 1040, actuator arms 1034, and voice coil motor 1050 may be referred to collectively as a rotary actuator assembly.

Data is recorded onto the disk's surface 1035 in a pattern of concentric rings known as data tracks 1036. The disk's surface 1035 is spun at high speed by means of a motor-hub assembly 1030. Data tracks 1036 are recorded onto spinning disk surfaces 1035 by means of magnetic heads 1056, which typically reside at the end of sliders 1055.

Figure 1:
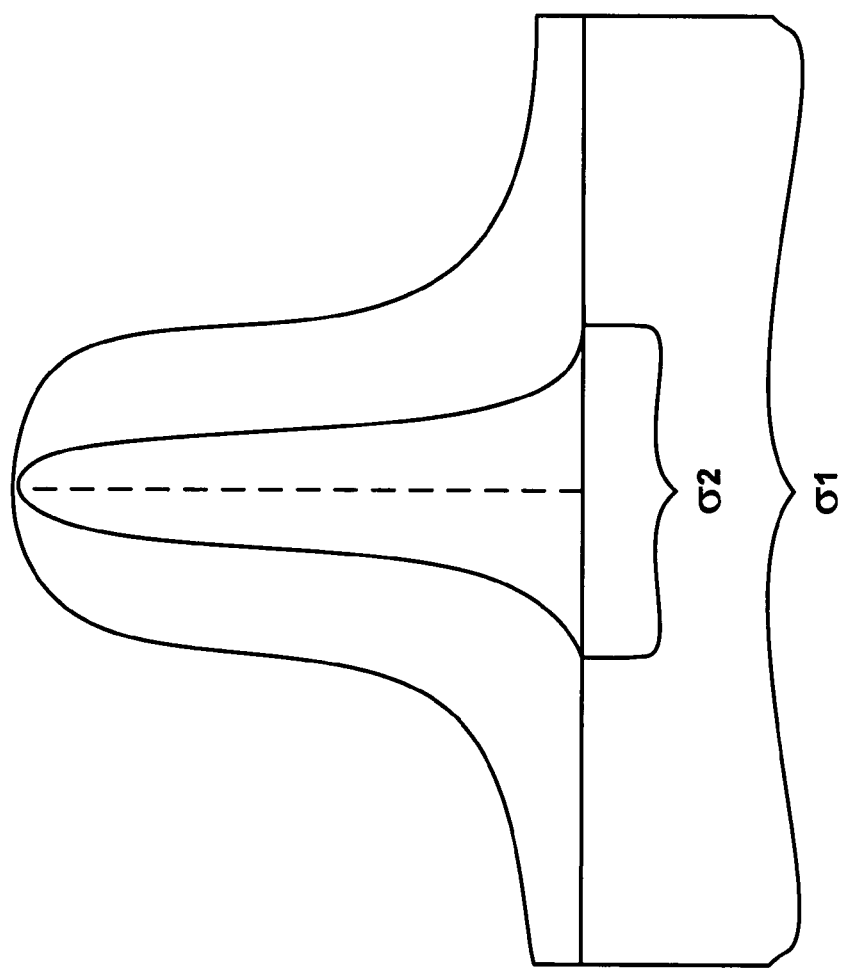
FIG. 1 depicts a distribution of fly heights for a population of sliders.

FIG. 10 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Conclusion

Although various embodiments pertain to reducing fly height sigma, various embodiments may be used separately from each other, or in various combinations, to reduce fly height sigma.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A slider designed to reduce fly height sigma, the slider comprising:
   an air bearing surface:
   a front shallow step pad and a rear shallow step pad that are at a first level deeper than the air bearing surface;
   a plurality of channels, each of said channels having an opening only toward the front of said air bearing surface, said plurality of channels comprising:
      at least one left side channel formed in a left side rail of said air bearing surface at said first level deeper than said air bearing surface; and
      at least one right side channel formed in a right side rail of said air bearing surface at said first level deeper than said air bearing surface; and
   rear side pockets in close proximity to rear corners of the slider, said rear side pockets at a second level deeper than either the air bearing surface or the first level, wherein the first level ranges from approximately 0.05 to 0.40 microns deeper than the air bearing surface and the second level ranges from approximately 1.0 to 4.0 microns deeper than the air bearing surface, said rear side pockets comprising:
      at least one of said rear side pockets located at approximately the rear of said at least one left side channel distal from said channel opening; and
      at least one of said rear side pockets located at approximately the rear of said at least one right side channel distal from said channel opening.

2. The slider of claim 1, wherein the rear side pockets are in close proximity to landing pads that are associated with the slider.

* * * * *